US008115044B2

(12) United States Patent
Chekhmir et al.

(10) Patent No.: US 8,115,044 B2
(45) Date of Patent: *Feb. 14, 2012

(54) PROCESS AND COMPOSITION FOR THE IMMOBILIZATION OF HIGH ALKALINE RADIOACTIVE AND HAZARDOUS WASTES IN SILICATE-BASED GLASSES

(75) Inventors: Anatoly Chekhmir, Ma'aleh Adumim (IL); Arthur Gribetz, Jerusalem (IL)

(73) Assignee: GeoMatrix Solutions, Inc., Wilmington, DE (US)

( * ) Notice: Subject to any disclaimer, the term of this patent is extended or adjusted under 35 U.S.C. 154(b) by 1307 days.

This patent is subject to a terminal disclaimer.

(21) Appl. No.: 11/723,541

(22) Filed: Mar. 20, 2007

(65) Prior Publication Data

US 2008/0020918 A1 Jan. 24, 2008

Related U.S. Application Data

(60) Provisional application No. 60/783,415, filed on Mar. 20, 2006.

(51) Int. Cl.
*G21F 9/00* (2006.01)
*B09B 3/00* (2006.01)
*C03C 3/118* (2006.01)
*C03C 3/091* (2006.01)
*C03C 3/087* (2006.01)
*C03C 3/064* (2006.01)

(52) U.S. Cl. ........... 588/11; 588/14; 588/15; 588/16; 588/252; 501/59; 501/66; 501/70; 501/77

(58) Field of Classification Search .................. None
See application file for complete search history.

(56) References Cited

U.S. PATENT DOCUMENTS

| | | | |
|---|---|---|---|
| 3,000,072 A | 9/1961 | Evans | |
| 3,249,551 A | 5/1966 | Bixby | |
| 3,837,872 A | 9/1974 | Conner | |
| 3,959,172 A | 5/1976 | Brownell et al. | |
| 4,028,265 A | 6/1977 | Barney et al. | |
| 4,119,561 A | 10/1978 | Drobnik et al. | |
| 4,224,177 A | 9/1980 | Macedo et al. | |

(Continued)

FOREIGN PATENT DOCUMENTS

EP 004397 A1 3/1979

(Continued)

OTHER PUBLICATIONS

Huang et al., "Properties and Solubility of Chrome in Iron Alumina Phosphate Glasses Containing High Level Nuclear Waste", *Glass Science and Technology*, 2004, vol. 77, No. 5, abstract, ISSN 0946-7475.

Bottinga, et al.; The Viscosity of Magmatic Silicate Liquids: A Model for Calculation, American Journal of Science, May 1972, 272, pp. 438-475.

U.S. Dept. of Energy, Office of Civilian Radioactive Waste Management: Waste Acceptance System Requirements Document (WSRD), Revision 4, Jan. 2002, pp. 33-34.

(Continued)

*Primary Examiner* — Melvin Mayes
*Assistant Examiner* — Guinever Gregorio
(74) *Attorney, Agent, or Firm* — Pillsbury Winthrop Shaw Pittman LLP (57) ABSTRACT

The present invention provides processes to immobilize high alkaline radioactive and/or hazardous waste in a silicate-based glass, the waste containing one or more of radionuclides, hazardous elements, hazardous compounds, and/or other compounds. The invention also provides silicate-based glass compositions for use in immobilizing radioactive and/or hazardous waste.

25 Claims, 3 Drawing Sheets (3 of 3 Drawing Sheet(s) Filed in Color)

U.S. PATENT DOCUMENTS

| | | | |
|---|---|---|---|
| 4,274,976 A | 6/1981 | Ringwood | |
| 4,297,304 A | 10/1981 | Scheffler et al. | |
| 4,329,248 A | 5/1982 | Ringwood | |
| 4,351,749 A | 9/1982 | Ropp | |
| 4,354,954 A | 10/1982 | Koster et al. | |
| 4,363,757 A | 12/1982 | Koster et al. | |
| 4,377,507 A | 3/1983 | Pope et al. | |
| 4,464,294 A | 8/1984 | Thiele | |
| 4,488,990 A | 12/1984 | Yannopoulos | |
| 4,528,011 A | 7/1985 | Macedo et al. | 65/30.13 |
| 4,534,893 A | 8/1985 | Dippel et al. | |
| 4,632,778 A | 12/1986 | Lehto et al. | |
| 4,797,232 A | 1/1989 | Aubert | 252/629 |
| 4,868,141 A | 9/1989 | Fine | |
| 5,102,439 A | 4/1992 | Jantzen | 65/29 |
| 5,256,338 A | 10/1993 | Nishi et al. | |
| 5,649,894 A | 7/1997 | White et al. | |
| 5,656,009 A | 8/1997 | Feng et al. | |
| 5,711,016 A | 1/1998 | Carpena et al. | |
| 5,750,824 A | 5/1998 | Day | |
| 5,771,472 A | 6/1998 | Carpena et al. | |
| 5,882,581 A | 3/1999 | Gotovchikov et al. | |
| 5,926,771 A | 7/1999 | Brown | |
| 5,926,772 A | 7/1999 | Kalb et al. | |
| 5,947,887 A | 9/1999 | White et al. | |
| 5,960,368 A | 9/1999 | Pierce et al. | |
| 5,994,609 A | 11/1999 | Luo | |
| 6,023,006 A | 2/2000 | Figuet et al. | |
| 6,160,238 A | 12/2000 | Titus et al. | 219/121.37 |
| 6,258,994 B1 | 7/2001 | Jantzen et al. | |
| 6,329,563 B1 | 12/2001 | Cicero-Herman et al. | 588/12 |
| 6,472,579 B1 | 10/2002 | Anshits et al. | |
| 6,515,795 B1 * | 2/2003 | Dejneka et al. | 359/341.5 |
| 6,734,334 B2 | 5/2004 | Chekhmir et al. | |
| 7,550,645 B2 | 6/2009 | Chekhmir et al. | |
| 7,825,288 B2 | 11/2010 | Chekhmir et al. | |
| 2002/0038070 A1 | 3/2002 | Chekhmir et al. | |
| 2002/0103069 A1 | 8/2002 | Young | 501/57 |
| 2002/0111525 A1 | 8/2002 | Pal et al. | 588/13 |
| 2004/0024277 A1 | 2/2004 | Mulcey et al. | 588/11 |

FOREIGN PATENT DOCUMENTS

| | | |
|---|---|---|
| EP | 0 044 149 A1 | 1/1982 |
| EP | 2 841 370 | 12/2003 |
| WO | WO 97-19034 | 5/1997 |
| WO | WO 2005/084756 | 9/2005 |

OTHER PUBLICATIONS

Pacific Northwest National Laboratory, PNNL-13582: High-Level Waste Melter Study Report; submitted to U.S. Department of Energy Jul. 2001, Section 3.0 and Appendix C.

U.S. Dept. of Energy, Office of Waste Management; High-Level Waste Borosilicate Glass: A Compendium of Corrosion Characteristics, vol. 2, Mar. 1994, pp. 267-282.

Lutze, et al.; Radioactive Waste Forms for the Future; Eisevier Science Publishers B.V., 1998, Chapter 1, pp. 24-29.

Persikov, Edward S.; The Viscosity of Magmatic Liquids: Experiment, Generalized Patterns. A Model for Calculation and Prediction Applications; Advances of Physical Chemistry of Magmas (Springer-Verlag, 1991), Chapter 1, pp. 1-40.

E.K. Hansen, et al.; Mixing Envelope D Sludge with LAW Intermediate Products with and without Glass Formers, Westinghouse Savannah River Company, Sep. 2001, Table B-40, p. 116, Table B-41, p. 117 and Table B-42, p. 119-120.

G.L. Smith et al.; Verification and Product Testing of C-104 and AZ-102 Pretreated Sludge Mixed with Flowsheet Quantities of Secondary Wastes, Feb. 2001, Table 3.6, pp. 3.10-3.11, and Table 3.9, pp. 3.12-3.13.

Chekhmir, et al., Diffusion in Magmatic Melts: New Study, found in Chapter 3, Physical Chemistry of Magmas, pp. 99-119.

Epelbaum et al.; Zonality of Crystal is One More Possible Barrier to Migration of Radionuclides, Geological Problems of Radioactive Waste Burial, Contribution of Physical-Chemical Petrology. vol. 18 (Miass, 1994), pp. 126-138. (partial translation only).

U.S. Dept. of Energy, Office of Environmental Management; Waste Acceptance Product Specifications for Vitrified High-Level Waste Forms, WAPS, Dec. 1996, pp. 1, 5-6, 23, 30-31.

Carron, Jean-Paul; Vue d'ensemble sur la rhéologie des magmas silicates naturels, Laboratoire de géologie de l'École normale supérieure, Paris, Bull. Soc. Fr. Minéral. Cristalloger. (1969), 92, 435-446.

Jantzen et al., "Systems Approach to Nuclear Waste Glass Development" *Journal of Non-Crystalline Solids*, vol. 84, North-Holland Physics Publishing, Jul. 2, 1986, XP002845987, pp. 215-225.

Marples, J. A. C., "The Preparation, Properties, and Disposal of Vitrified High Level Waste from Nuclear Fuel Reprocessing", Review Paper, *Glass Technology*, vol. 29, No. 6, Dec. 6, 1988, XP008128666, pp. 230-247.

\* cited by examiner

PROCESS AND COMPOSITION FOR THE IMMOBILIZATION OF HIGH ALKALINE RADIOACTIVE AND HAZARDOUS WASTES IN SILICATE-BASED GLASSES

CROSS-REFERENCE TO RELATED APPLICATIONS

This application claims priority to U.S. Provisional Patent Application Ser. No. 60/783,415 filed Mar. 20, 2006, which is incorporated herein by reference in its entirety.

BACKGROUND

1. Field of the Invention

The present invention relates generally to treatment of high alkaline radioactive and hazardous wastes, and more particularly to processes for immobilizing a waste containing one or more of radionuclides, hazardous elements, hazardous compounds, and other compounds present in the waste.

2. Background of the Invention

The use of radioactive and hazardous materials in the world has led to the accumulation of a significant amount of radioactive and hazardous wastes. There is an international consensus regarding the planned disposal of these wastes by burying them in the ground in deep geological repositories. At the present time, high-level radioactive wastes are being placed in long-term storage awaiting permanent disposal. Once buried, with the passage of time, groundwater and hydrothermal solutions can make contact with the radionuclides, hazardous elements, or hazardous compounds contained in the wastes. As a result, groundwater and hydrothermal solutions can facilitate the leaching of radionuclides, hazardous elements, and hazardous compounds out of the wastes into the biosphere in which plants and animals live. In addition, even without the interference from groundwater and hydrothermal solutions, radionuclides, hazardous elements, or hazardous compounds could possibly diffuse out of the wastes, resulting in contamination of the biosphere. Therefore, improper containment of the wastes can create a significant problem.

There are a number of existing processes that can potentially reduce the leaching and/or diffusion of radioactive and hazardous wastes. The existing processes, however, have various disadvantages. For example, cementation is commonly used to immobilize low-level and intermediate-level radioactive waste. This process is undesirable because a large volume of cement is required to immobilize a small quantity of wastes vastly increasing the size of the disposal area. Furthermore, cement is highly susceptible to both leaching and diffusion.

The most common method of handling high-level radioactive wastes is vitrification in borosilicate glass. Vitrification is currently being used in a number of countries including France, the United States of America, Korea, Italy, Germany, the United Kingdom, Japan, Belgium, China, and Russia. Conventional vitrification processes, however, are limited in the amount of waste that can be contained, and efforts to increase waste loading capacity of borosilicate glasses or melts have led to high crystallinity, increased rates of leaching, and increased corrosion of the melter, rendering the compositions unsuitable for use in conventional vitrification melters.

Thus, a need exists for improved vitrification processes and borosilicate glass-like compositions that achieve higher waste loading without the above-mentioned disadvantages on use of the processes and compositions with conventional vitrification melters.

Although low-level radioactive waste is not generally vitrified, in the U.S., for example, low-level radioactive waste with high sodium content is planned to be vitrified at the Waste Treatment Plant in Richland, Washington State. Sodium is a high active alkaline element, which, when immobilized in borosilicate glass in high concentrations, causes lack of durability of the glass. Much of the low-level radioactive waste found in the U.S. radioactive waste sites, such as Envelope A of the Hanford LAW (the majority of the LAW to be processed at the Hanford Waste Treatment Plant) is characterized by high sodium concentrations. The currently planned sodium waste loading for these low-level radioactive wastes is between about 20-23 weight percent, although the actual acceptable waste as reported in industry is between about 18-20 weight percent. When greater amounts of sodium are introduced into the final glass, it becomes unstable and is unable to satisfy the waste form acceptance criteria and the processing requirements for a vitrification melter.

In order to increase the concentration of sodium in the final glass, one must create a composition that will incorporate this sodium yet satisfy the waste form acceptance criteria and the processing requirements for a vitrification melter. The waste form acceptance criteria (durability and leach resistance of the glass) are tested by Vapor Hydration Test (VHT), Product Consistency Test (PCT) and Toxicity Characteristic Leach Procedure (TCLP). The processing requirements include viscosity, specific electrical conductivity and crystallization.

Thus, a need exists for improved vitrification processes and borosilicate glass-like compositions that achieve higher sodium waste loading without the above-mentioned disadvantages on use of the processes and compositions with conventional vitrification melters.

BRIEF SUMMARY OF THE INVENTION

The present invention provides a process for immobilizing high alkaline radioactive and/or hazardous waste in silicate-based glasses, and compositions for use in the processes. In one aspect of the present invention, a process is provided for immobilizing high alkaline waste comprising combining the waste with glass-forming components in particular proportions, melting the mixture to form a glass integrating the waste with properties suitable for waste vitrification melters, pouring the melted glass with integrated waste into a receptive canister, and solidifying the melted glass with the integrated waste by cooling. In addition to use of standard waste vitrification melters, the waste may be vitrified in an "in-container" or "in-can" process which eliminates the necessity of pouring the melted glass with integrated waste into a receptive canister. The ratio between the rock-forming components of the glass formed (i.e. $SiO_2$, $Al_2O_3$, alkaline earth oxides and alkaline oxides) approximates the ratio between the main components of natural high alkaline ultrabasic rock. This glass is especially suitable for immobilizing high alkaline wastes.

In another aspect of the present invention, a process is provided for immobilizing high alkaline waste comprising combining the waste with glass-forming components in particular proportions, melting the mixture at a temperature of up to about 1150° C., to form a low viscosity melted glass having a viscosity of about 20 to about 100 poise, with properties such as specific electrical conductivity ranging between about $0.1\Omega\text{-}1\ cm^{-1}$ to about $0.7\Omega\text{-}1\ cm^{-1}$, suitable for waste vitrification melters, pouring the melted glass with integrated waste into a receptive canister, and solidifying the melted glass with integrated waste by cooling. At present, the melting temperature used for vitrification in the U.S. is 1150° C. It is known that higher melting temperatures increase the processing rates for vitrification. Although the processes and glasses of the present invention have desirable advantages at melting temperatures of up to about 1150° C., higher and lower temperatures are also suitable and advantageous. In addition to use in standard waste vitrification melters, the waste may be vitrified in an "in-container" or "in-can" vitrification process which eliminates the necessity of pouring the melted glass with integrated waste into a receptive canister. In preferred embodiments of the present invention, the ratio between the rock-forming components of the glass formed approximates the ratio between the main components of natural high alkaline ultrabasic rock.

In a further aspect of the present invention, a process is provided for the immobilization of high alkaline radioactive and/or hazardous waste in a silicate-based glass. In the process, a silicate-based glass is formed in which the ratio between the rock-forming components of the glass formed approximates the ratio between the main components of natural high alkaline ultrabasic rock. The silicate-based glass formed is used as an immobilizing matrix for radioactive and hazardous waste. The process involves melting together glass-forming and waste components consisting essentially of three groups of oxides: ($R_2O+RO$), $R_2O_3$, and ($RO_2+R_2O_5$). The ratio between the rock-forming components of the glass formed is about (1.6-2.2):(1):(2-3) in weight percent, where the ($R_2O+RO$) consists primarily of $Na_2O$, the $R_2O_3$ consists primarily of $Al_2O_3$, and the ($RO_2+R_2O_5$) consists primarily of $SiO_2$. In addition, higher amounts of $B_2O_3$ and other flux components are used than in other silicate-based glasses for immobilizing high-alkaline waste, in order to reduce the melting temperature of the ultrabasic rock.

In yet another aspect of the present invention, a silicate-based glass composition is provided for the immobilization of high alkaline radioactive and/or hazardous waste. The ratio between the rock-forming components of the glass formed approximates the ratio between the main components of natural high alkaline ultrabasic rock. The silicate-based glass consists essentially of three groups of oxides: ($R_2O+RO$), $R_2O_3$, and ($RO_2+R_2O_5$). The rock-forming components of this glass has a ratio of about (1.6-2.2):(1):(2-3) in weight percent, where the ($R_2O+RO$) consists primarily of $Na_2O$, the $R_2O_3$ consists primarily of $Al_2O_3$, and the ($RO_2+R_2O_5$) consists primarily of $SiO_2$. In addition, higher amounts of $B_2O_3$ and other flux components are used than in other silicate-based glasses for immobilizing high-alkaline waste, in order to reduce the melting temperature of the ultrabasic rock.

The glass formed by these processes, and according to these compositions, incorporates a substantially higher percentage of high alkaline waste than previously practiced, while at the same time satisfying both the processing requirements (including viscosity, specific electrical conductivity and crystallinity) and waste form acceptance criteria (including durability and leach resistance of the glass, tested by Vapor Hydration Test (VHT), Product Consistency Test (PCT) and Toxicity Characteristic Leach Test Procedure (TCLP)) for glasses produced in waste vitrification melters. Additional advantages and features of the present invention will be apparent from the following detailed description and examples which illustrate preferred embodiments of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

Reference will now be made in detail to the presently preferred embodiments of the invention, which, together with the following examples, serve to explain the principles of the invention. These embodiments are described in sufficient detail to enable those skilled in the art to practice the invention, and it is to be understood that other embodiments may be utilized, and that structural, chemical, and physical changes may be made without departing from the spirit and scope of the present invention.

Definitions

The term "waste" includes waste materials, such as fission products, which contain radionuclides, hazardous elements, radioactive compounds, hazardous compounds, and/or other components present in the waste. Waste mixtures can include, for example, the following elements and their compounds: Fe, Na, S, P, Cr, Al, Mn, Ni, Na, Zr, K, Cs, Ru, Sr, Ba, Tc, Rh, Mg, I, lanthanides, actinides (for example, Th, U, Pu, Np, Am, Cm, and Ce), and their compounds, and other components of radioactive and hazardous waste. The waste may also include noble metals and volatile components such as $H_2O$ and/or $CO_2$. Not all of these elements and their compounds, if separated, are hazardous.

The term "radionuclide" includes any nuclide that emits radiation, including one or more of alpha, beta, and gamma emissions. The term "nuclide" includes an atomic species in which all atoms have the same atomic number and mass number. However, processes in which mixtures of different radionuclides are immobilized are specifically included within the scope of the present invention. Examples of radionuclides are Sr and Cs, and actinides and lanthanides, such as thorium and uranium.

The term "radioactive waste" includes three levels of radioactive wastes classified as follows:

1. "Low-level radioactive wastes" (LLW) and "Low-activity radioactive wastes" (LAW) are generated primarily from hospitals, laboratories, and the industrial sector. Low-level radioactive wastes are also generated when constituents are removed from high-level radioactive wastes in order to concentrate high-level radioactive wastes. Low-level radioactive wastes represent about 90% by volume but only about one percent by radioactivity of all radioactive wastes in the world.

2. "Intermediate-level radioactive wastes" (ILW) comprise resins, chemical sludge, and nuclear reactor components. Intermediate-level radioactive wastes represent about seven percent by volume and about four percent by radioactivity of all radioactive wastes in the world.

3. "High-level radioactive wastes" (HLW) comprise spent nuclear reactor fuel (spent fuel) and other high-level radioactive wastes generated principally from reprocessing the spent fuel and from nuclear weapons development. High-level radioactive wastes represent only about three percent by volume but about 95% by radioactivity of all radioactive wastes in the world.

The term "element" used in the context of radioactive or hazardous elements includes an atomic element of the periodic table. The term "compound" used in the context of hazardous or radioactive compounds includes a substance composed of two or more elements.

The term "hazardous wastes" is defined in the EPA Environmental Glossary as any waste or combination of wastes which pose a substantial present or potential hazard to human health or living organisms because such wastes are non-degradable or persistent in nature or because they can be biologically magnified, or because they can be lethal, or because they may otherwise cause or tend to cause detrimental cumulative effects.

Because many of the compounds of waste mixtures are converted to oxides in a vitrification process, the mixtures are commonly referred to in terms of their "waste oxide" content. The term "waste oxide loading", "loading of waste oxides", "waste loading", or "loading of waste" refers to the weight percentage of the waste mixture (once it is thermally converted to oxides in a vitrification process and which can include non-hazardous components) in the final product of a waste immobilizing process. As used herein, the abbreviation "wt %" means weight percent.

As used herein, a "natural high alkaline ultrabasic rock" is determined by the ratio in weight percent between (a) the sum of monovalent cation oxides ($R_2O$) and divalent cation oxides (RO) which are network modifying components, (b) trivalent cation oxides ($R_2O_3$) which are network forming components, and (c) the sum of tetravalent cation oxides ($RO_2$) and pentavalent cation oxides ($R_2O_5$), which are also network forming components. A shorthand manner of depicting or referring to this ratio used herein is ($R_2O+RO$):$R_2O_3$:($RO_2+R_2O_5$). This ratio for natural high alkaline ultrabasic rock is about (1.6-2.2):(1):(2-3) in weight percent.

As used herein, "$R_2O$" refers to a monovalent cation oxide including, but not limited to $Li_2O$, $Na_2O$ and $K_2O$; "RO" refers to a divalent cation oxide including, but not limited to CaO, MgO and SrO; "$R_2O_3$" refers to a trivalent cation oxide including, but not limited to $Al_2O_3$ and $Fe_2O_3$; "$RO_2$" refers to a tetravalent cation oxide including, but not limited to $SiO_2$ and $ZrO_2$; and "$R_2O_5$" refers to a pentavalent cation oxide including, but not limited to $P_2O_5$.

The term "rock-forming components" includes primarily $SiO_2$, $Al_2O_3$, $ZrO_2$, alkaline earth oxides and alkaline oxides. The term "glass-forming components" includes primarily $SiO_2$, $Al_2O_3$, $ZrO_2$, $B_2O_3$, $P_2O_5$, alkaline earth oxides and alkaline oxides; glass stabilizers including, but not limited to, $ZrO_2$ and $TiO_2$; and fluxes such as $Li_2O$, F, $B_2O_3$ and $P_2O_5$ ($B_2O_3$ and $P_2O_5$ can act both as glass-forming component and as fluxes). The term "flux components" includes primarily $B_2O_3$, $P_2O_5$, and F.

The term "silicate-based glasses" includes, but is not limited to, different types of silicate-based glasses such as borosilicate glass, phosphorus-silicate glass, titanium-silicate glass and zirconium-silicate glass. Although the preferred embodiments discussed herein refer to borosilicate glass, it is understood that the present invention is not limited to borosilicate glasses, but includes the use of other silicate-based glasses as the immobilizing matrix.

Description

The present invention is directed to an improved glass composition that is designed to be as similar as possible to natural rock which is stable, i.e., can incorporate waste (including high alkaline waste) and still satisfy the waste form acceptance criteria and the processing requirements for a vitrification melter. There are four main types of natural rock: granite, andesite, basalt and ultrabasic. What primarily differentiates between them is the concentration of the network forming components $SiO_2$ and $Al_2O_3$. Table 1 shows the average concentrations of these oxides in each type of rock.

TABLE 1

Average Concentrations of $SiO_2$ and $Al_2O_3$ in the Four Main Types of Natural Rock (in weight percent)*

|  | Granite | Andesite | Basalt | Ultrabasic |
| --- | --- | --- | --- | --- |
| $SiO_2$ | 71 | 57 | 49 | 39 |
| $Al_2O_3$ | 14 | 15 | 15 | 17 |

*Taylor S. R. and McLennan A. H. The Continental Crust: Its Composition and Evolution (Blackwell, 1985 xv)

As can be seen from Table 1, the $SiO_2$ concentration in ultrabasic rock is less than that found in the other types of rock, and the $Al_2O_3$ concentration in ultrabasic rock is greater than that found in the other types of rock. This relatively higher concentration of $Al_2O_3$ in ultrabasic rock allows the incorporation of higher amounts of alkalines than in the other three types of rock, because the Al in the aluminasilicates bonds with the alkalines and forms strong structural units.

A natural high alkaline ultrabasic rock is determined by the ratio in weight percent between (a) the sum of monovalent cation oxides ($R_2O$) and divalent cation oxides (RO) which are network modifying components, (b) trivalent cation oxides ($R_2O_3$) which are network forming components, and (c) the sum of tetravalent cation oxides ($RO_2$) and pentavalent cation oxides ($R_2O_5$), which are also network forming components. A shorthand manner of depicting or referring to this ratio used herein is ($R_2O+RO$):$R_2O_3$:($RO_2+R_2O_5$). The ($R_2O+RO$):$R_2O_3$:($RO_2O_5$) ratio for natural high alkaline ultrabasic rock is about (1.6-2.2):(1):(2-3) in weight percent.

In a first preferred embodiment of the present invention, a silicate-based glass is produced having a ($R_2O+RO$):$R_2O_3$: ($RO_2+R_2O_5$) ratio between the rock-forming components of the glass formed of (1.6-2.2):(1):(2-3) in weight percent. This ratio approximates the ratio between the main components of natural high alkaline ultrabasic rock.

In a second preferred embodiment of the present invention, a silicate-based glass is produced in which the ($R_2O+RO$): $R_2O_3$:($RO_2+R_2O_5$) ratio is (1.6-2.2):(1):(2-3) in weight percent, and in which the ($R_2O+RO$) consists primarily of greater than about 23 weight percent $Na_2O$, the $R_2O_3$ consists primarily of between about 13 and 20 weight percent $Al_2O_3$, and the ($RO_2+R_2O_5$) consists primarily of between about 30 and 48 weight percent $SiO_2$. This (1.6-2.2):(1):(2-3) ratio is similar to that of the ratio between the main components of natural high alkaline ultrabasic rock.

The glass of this embodiment is substantially more stable than (1) silicate-based glasses currently produced for immobilizing high alkalines which do not have a (1.6-2.2):(1):(2-3) ratio between their rock-forming components, or (2) silicate-based glasses for immobilizing high alkalines which have a (1.6-2.2):(1):(2-3) ratio between their rock-forming components but which do not contain greater than about 23 weight percent $Na_2O$, between about 13 and 20 weight percent $Al_2O_3$, and between about 30 and 48 weight percent $SiO_2$.

In a third preferred embodiment of the present invention, a silicate-based glass is produced in which the $(R_2O+RO)$: $R_2O_3$:$(RO_2+R_2O_5)$ ratio is (1.6-2.2):(1):(2-3) in weight percent, and in which the $(R_2O+RO)$ consists primarily of greater than about 23, 24, 25, 26, 27, or 28 weight percent $Na_2O$, the $R_2O_3$ consists primarily of between, e.g., about 15-20 weight percent $Al_2O_3$, and the $(RO_2+R_2O_5)$ consists primarily of between about 30 and 48 weight percent $SiO_2$. This (1.6-2.2):(1):(2-3) ratio is similar to that of the ratio between the main components of natural high alkaline ultrabasic rock.

In a fourth preferred embodiment of the present invention, $B_2O_3$ and other flux components, such as $P_2O_5$, and F, which, in total, range between about 9 and 15 weight percent are added to a glass of the prior embodiments. (Although $Li_2O$ is used as a flux component as well, it is an alkaline oxide and therefore will not be added in a high-alkaline waste because it will reduce the amount of alkaline waste that can be immobilized). The $B_2O_3$ has 2 functions. It behaves as a glass-forming component, preventing phase separation, in contrast to $P_2O_5$ or F, which, if used in amounts greater than approximately 5 weight percent, will cause phase separation. (Ultrabasic rock cannot be vitrified by itself without the addition of glass-forming components such as $B_2O_3$). In addition to being a glass-forming component, $B_2O_3$ plays the role of a flux which decreases the melting point of the total composition, producing borosilicate glass which is required for use in conventional vitrification melters. Our concentration of $B_2O_3$ and other flux components, which, in total range between about 9 and 15 weight percent, is substantially higher than the concentration of $B_2O_3$ and other flux components that is found in other borosilicate glasses which immobilize high-alkaline waste.

The $B_2O_3$ and other flux components are not rock-forming components, so although the ratio of the components of the final borosilicate glass is about (1):(1):(1), the $(R_2O+RO)$: $R_2O_3$:$(RO_2+R_2O_5)$ ratio of the rock-forming components of the glass (i.e. all of the components excluding $B_2O_3$ and other flux components) remains about (1.6-2.2):(1):(2-3). This ratio between the rock-forming components of the glass is what is essential in that it is similar to the ratio between the main components of ultrabasic rock, and thus gives the borosilicate glass of the preferred embodiment the stability that is inherent in ultrabasic rock. The $B_2O_3$ that is added (thus producing borosilicate glass) is a non-coherent oxide for igneous rocks such as ultrabasic rocks.

The advantage of the present invention is two-fold: firstly, it enables higher waste loadings than have been previously achieved using borosilicate glass in existing vitrification systems, while also satisfying processing and product quality requirements for waste vitrification (i.e., viscosity, specific electrical conductivity and chemical durability). See, for example, U.S. DOE/RW Waste Acceptance System Requirements Document (WASRD), and *Glass Formulations for Immobilizing Hanford Low-Activity* Wastes, D-S. Kim et al., Waste Management '06 Conference, Feb. 26-Mar. 2, 2006, Tucson, Ariz., for processing and product quality requirements in the U.S. Secondly, it enables the achievement of these high waste loadings according to an algorithm, thus minimizing empirical trial and error. Both of these advantages render this invention commercially valuable.

It must be emphasized that the processes and glasses of the present invention are suitable for use in conventional melters and is also suitable for use in supplemental vitrification technologies, such as but not exclusively, AMEC Earth and Environmental Inc.'s "Bulk Vitrification," which is an "in-container" vitrification technology.

For example, when the glasses of the preferred embodiment are compared to AMEC Earth and Environmental Inc.'s AMBG-13 glass (the glass composition produced by Pacific Northwest National Laboratory for AMEC, and determined to be the most suitable and selected as the baseline composition to test AMEC's Bulk Vitrification process as a supplemental treatment technology for vitrifying Hanford Waste Treatment Plant's high sodium low activity radioactive waste), we see that the ratio between $(R_2O+RO)$, $R_2O_3$, and $(RO_2+R_2O_5)$ in weight percent for the rock-forming components of the AMBG-13 glass is (1.24):(1):(2.41). This AMBG-13 glass has a $Na_2O$ loading of 20 weight percent, 9.89 weight percent $Al_2O_3$, and 42.55 weight percent $SiO_2$. The flux components of the AMBG-13 glass include 5 weight percent $B_2O_3$, 0.07 weight percent F and 0.6 weight percent $P_2O_5$. See *Glass Formulations for Immobilizing Hanford Low-Activity Wastes*, D-S. Kim et al., Waste Management '06 Conference, Feb. 26-Mar. 2, 2006, Tucson, Ariz.

Using the same waste simulant recipe as the AMBG-13 glass, application of the teachings of the present invention produced a borosilicate glass with a $Na_2O$ loading of 28 weight percent while also satisfying processing and product quality requirements for waste vitrification (i.e., viscosity, specific electrical conductivity and chemical durability). This success in producing higher sodium waste loading is due to the approximate (1.6-2.2):(1):(2-3) ratio between the $(R_2O+RO)$, $R_2O_3$, and $(RO_2+R_2O_5)$ rock-forming components of the glass of the present invention, which is maintained primarily due to greater than about 23 weight percent $Na_2O$, between about 13 and 20 weight percent $Al_2O_3$, and between about 30 and 48 weight percent $SiO_2$.

Specifically, in the resultant glass, the $(R_2O+RO)$ consists primarily of 28 wt % $Na_2O$, the $R_2O_3$ consists primarily of 16 wt % $Al_2O_3$, and the $(RO_2+R_2O_5)$ consists primarily of 36 wt % $SiO_2$ and 5 wt % $ZrO_2$. (The total wt % of these main components is 85% and not 100% because 14 wt % $B_2O_3$ and several minor components of the waste are not included. As mentioned above, the $B_2O_3$ is not included since it is a non-coherent oxide for igneous rocks such as ultrabasic rocks, and therefore behaves as a glass-forming component and not as a rock-forming component). The concentration of $B_2O_3$ and other flux components in this glass is approximately 14.77 weight percent. In combination, the concentrations of three of these major rock-forming components ($Na_2O$, $Al_2O_3$ and $SiO_2$) and the relatively high concentration of $B_2O_3$ and other flux components, are substantially different from their concentrations in currently produced borosilicate glasses that immobilize high alkaline wastes.

As mentioned above, the preferred glasses of the present invention use greater than about 23 weight percent $Na_2O$, between about 13 weight percent and 20 weight percent $Al_2O_3$, between about 30 weight percent and about 48 weight percent $SiO_2$, and in total between about 9 weight percent and 15 weight percent $B_2O_3$ and other flux components. The high concentrations of $Na_2O$ and $Al_2O_3$ (relatively higher than the concentrations generally used to produce borosilicate glasses immobilizing high alkaline wastes), and relatively low concentration of $SiO_2$ in the preferred glasses of the present invention allow maintenance of the approximate (1.6-2.2):(1):(2-3) ratio in weight percent of the rock-forming components. The relatively high concentration of $B_2O_3$ and other flux components decreases the melting point of the total composition.

While known high-alkaline glasses may have individual components within the preferred ranges, no known glass contains the combination of each of these four components ($Na_2O$, $Al_2O_3$, $SiO_2$, and $B_2O_3$) in the preferred ranges and an overall ratio between the rock-forming components that approximates that of natural high alkaline ultrabasic rock that is found in the silicate-based glasses of the present invention. For example, a known target glass evaluated during a recent performance enhancement study initiated by the U.S. Department of Energy for Hanford low-activity waste (LAWA 187; glass formulated for Hanford's Envelope A, AN-105 LAW) has a $Na_2O$ loading of 23 weight percent, 10.57 weight percent $Al_2O_3$ and 34.8 weight percent $SiO_2$, and a total concentration of $B_2O_3$ and other flux components of 12.77 weight percent. See *Performance Enhancements to the Hanford Waste Treatment and Immobilization Plant Low-Activity Waste Vitrification System*, Hamel et al., Waste Management '06 Conference, Feb. 26-Mar. 2, 2006, Tucson, Ariz. The ratio between ($R_2O+RO$), $R_2O_3$, and ($RO_2+R_2O_5$) in weight percent for the rock-forming components of the LAWA 187 glass, however, is (4.45):(1):(9.96).

Likewise, in comparing over 1,900 glass compositions that were formulated for Hanford wastes, none had both a ($R_2O+RO$), $R_2O_3$, and ($RO_2+R_2O_5$) ratio between the rock-forming components of their glass of (1.6-2.2):(1):(2-3) and a combination of concentrations of $Na_2O$, $Al_2O_3$, $SiO_2$ and $B_2O_3$ and other flux components within the ranges cited in the preferred embodiments. See: *Database and Interim Glass Property Models for Hanford HLW and LAW Glasses* (Vienna et al. 2002); *Performance Enhancements to the Hanford Waste Treatment and Immobilization Plant Low-Activity Waste Vitrification System*, Hamel et al., Waste Management '06 Conference, Feb. 26-Mar. 2, 2006, Tucson, Ariz.

Application of the teachings of the present invention to a specific problem or environment is within the capabilities of one having ordinary skill in the art in light of the teachings contained herein. Examples of the products and processes of the present invention appear in the following examples.

Example 1

Vitrifying Hanford Tank 241-S-109 Low-Active Waste (LAW) Simulant with 28 Weight Percent $Na_2O$ Loading 1. The Hanford Tank 241-S-109 LAW waste composition from Column A was used according to the amounts in Column B. Column C shows the amount (in weight percent) of the components in the target final glass product with a 28 weight percent $Na_2O$ loading.

| A Components | B Waste (wt %) | C 28% $Na_2O$ Loading (wt %) | D Additives (wt %) | E Final Glass (wt %) |
|---|---|---|---|---|
| $Al_2O_3$ | 1.3793 | 0.386 | 15.614 | 16.0 |
| $B_2O_3$ | 0 | 0 | 14.0 | 14.0 |
| CaO | 0.0395 | 0.011 | 0 | 0.011 |
| Cl | 0.1547 | 0.043 | 0 | 0.043 |
| $Cr_2O_3$ | 0.7008 | 0.196 | 0 | 0.196 |
| F | 0.0623 | 0.017 | 0.083 | 0.1 |
| $Fe_2O_3$ | 0.2219 | 0.062 | 0 | 0.062 |
| $K_2O$ | 0.1216 | 0.034 | 0 | 0.034 |
| $Na_2O$ | 94.9222 | 28.0 | 0 | 28.0 |
| $P_2O_5$ | 2.3903 | 0.669 | 0 | 0.669 |
| $SiO_2$ | 0 | 0 | 36.0 | 36.0 |
| $SO_3$ | 0.7055 | 0.197 | 0 | 0.197 |
| $ZrO_2$ | 0 | 0 | 5.0 | 5.0 |

2. Glass-forming components according to the amounts in Column D were added to the 241-S-109 waste composition, producing the final glass composition shown in Column E. The exact amounts of glass-forming components used were calculated together with the 241-S-109 waste components, so that the total amount of the components would achieve a ratio of ($R_2O+RO$):$R_2O_3$:($RO_2+R_2O_5$) in weight percent within the range of about (1.6-2.2):(1):(2-3). The ratio achieved was approximately (1.73):(1):(2.56).

3. The mixture of step 1 and step 2 was stirred together for 1 hour at ambient temperature, producing an aqueous suspension.

4. The product of step 3 was then dried at 150° C. for 3 hours in a laboratory oven.

5. The product of step 4 was then crushed and sieved through a 420 micron mesh, and then melted at 1150° C. for 2.5 hours in a muffle furnace.

6. The product of step 5 was then poured into a slab of carbon in which slots of 15 mm×15 mm×25 mm were carved. Other molds of differing materials (e.g., platinum, stainless steel, carbon, mullite, etc.) and differing sizes may be used. This was then cooled in the muffle furnace for a minimum of 15 hours, according to various cooling regimens, to ambient temperature.

Figure 1:
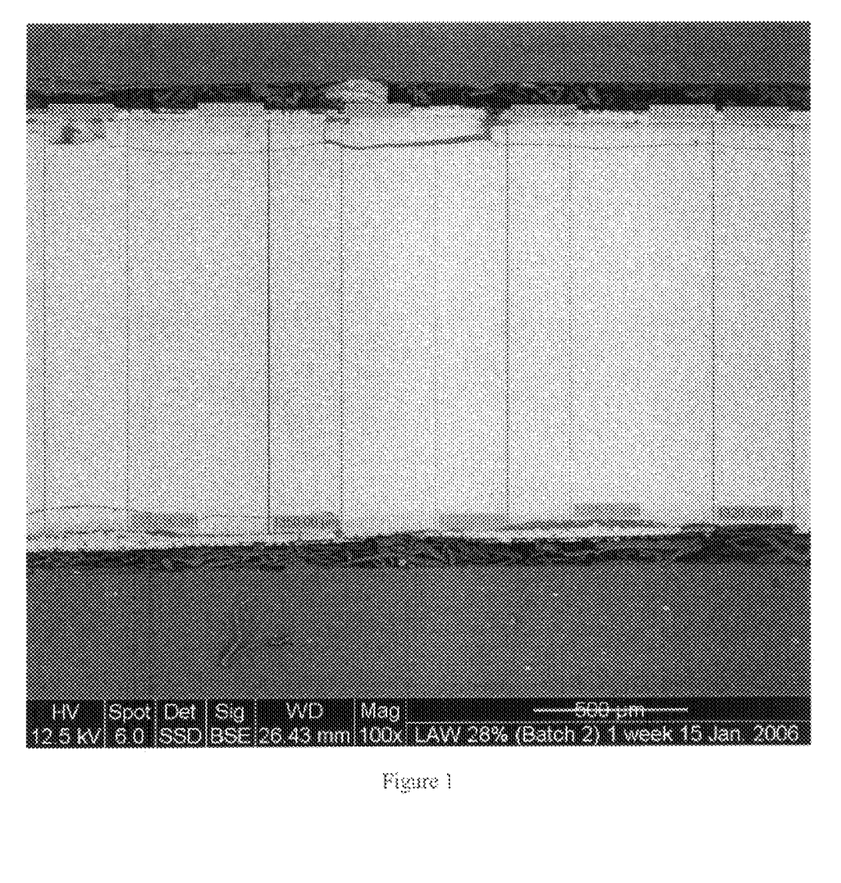
FIG. 1 is a scanning electron micrograph depicting the results of a one-week Vapor Hydration Test for a glass of the present invention.
Figure 2:
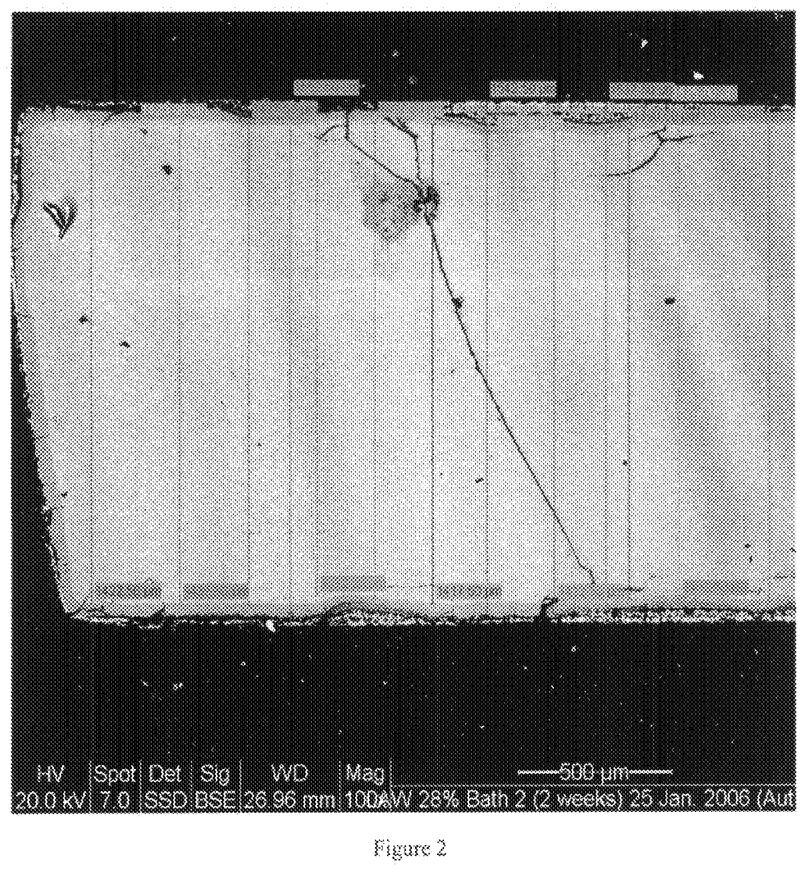
FIG. 2 is a scanning electron micrograph depicting the results of a two-week Vapor Hydration Test for a glass of the present invention.
Figure 3:
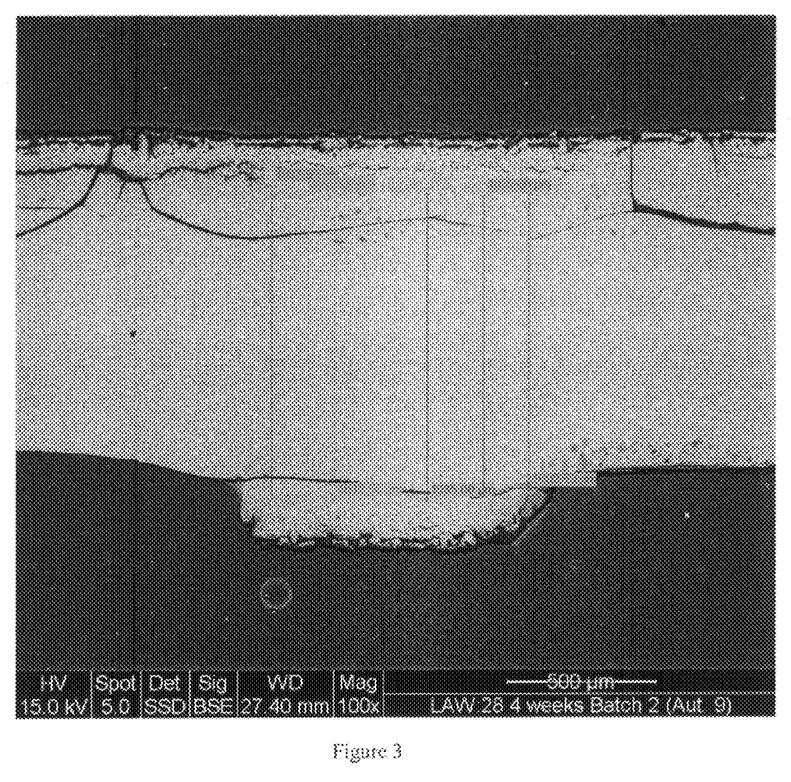
FIG. 3 is a scanning electron micrograph depicting the results of a four-week Vapor Hydration Test for a glass of the present invention.

7. The resultant glass was then tested to determine the suitability of this composition for processing using liquid-fed ceramic melter (LFCM) technology. The results of six tests demonstrated that the composition was suitable for processing using LFCM technology:

(a) Vapor Hydration Test (VHT) results (see Scanning Electron

Microscopy (SEM) photos in FIGS. 1-3):

1 week: 9.105 $g/m^2$/day (FIG. 1)

2 weeks: 16.203 $g/m^2$/day (FIG. 2)

4 weeks: 17.83 $g/m^2$/day (FIG. 3)

(These results are the average results taken from 4 VHT tests conducted on 3 separate batches prepared with the same glass composition)

(b) Viscosity: Ranges from 38.3 poise at 1150° C. to 382 poise at 950° C.

(c) Specific Electrical Conductivity: Ranges from 0.48 $\Omega^{-1}$ $cm^{-1}$ at 1150° C. to 0.26 $\Omega^{-1}$ $cm^{-1}$ at 950° C.

(d) Product Consistency Test (PCT) results ($g/m^2/d$): Na—$2.72\times10^{-1}$; B—$4.03\times10^{-1}$; Si—$2.27\times10^{-2}$.

(e) Toxicity Characteristic Leaching Procedure (TCLP) results (mg/L): Cr—1.8

(f) Secondary Phase Identification: No crystals were visible using X-ray diffraction.

Example 2

Vitrifying Hanford Tank AN-105 Low-Active Waste (LAW) Simulant with 28 Weight Percent $Na_2O$ Loading 1. The Hanford Tank AN-105 LAW waste composition from Column A was used according to the amounts in Column B. Column C shows the amount (in weight percent) of the components in the target final glass product with a 28 weight percent $Na_2O$ loading.

| A Components | B Waste (wt %) | C 28% Na$_2$O Loading (wt %) | D Additives (wt %) | E Final Glass (wt %) |
|---|---|---|---|---|
| Al$_2$O$_3$ | 17.347 | 6.432 | 9.567 | 16 |
| B$_2$O$_3$ | 0.075 | 0.027 | 11.972 | 12 |
| Cr$_2$O$_3$ | 0.065 | 0.024 | 0 | 0.024 |
| K$_2$O | 1.667 | 0.618 | 0 | 0.618 |
| Na$_2$O | 75.508 | 27.998 | 0 | 28 |
| SiO$_2$ | 0.101 | 0.037 | 35.962 | 36 |
| ZrO$_2$ | 0 | 0 | 5 | 5 |
| Cl | 2.101 | 0.779 | 0 | 0.779 |
| F | 0.009 | 0.003 | 0 | 0.003 |
| P$_2$O$_5$ | 0 | 0 | 0.6 | 0.6 |
| SO$_3$ | 2.626 | 0.973 | 0 | 0.973 |

2. Glass-forming components according to the amounts in Column D were added to the AN-105 waste composition, producing the final glass composition shown in Column E. The exact amounts of glass-forming components used were calculated together with the AN-105 waste components, so that the total amount of the components would achieve a ratio of (R$_2$O+RO):R$_2$O$_3$:(RO$_2$+R$_2$O$_5$) in weight percent within the range of about (1.6-2.2):(1):(2-3). The ratio achieved was approximately (1.78):(1):(2.59).

3. The mixture of step 1 and step 2 was stirred together for 1 hour at ambient temperature, producing an aqueous suspension.

4. The product of step 3 was then dried at 150° C. for 3 hours in a laboratory oven.

5. The product of step 4 was then crushed and sieved through a 420 micron mesh, and then melted at 1150° C. for 2.5 hours in a muffle furnace.

6. The product of step 5 was then poured into a slab of carbon in which slots of 15 mm×15 mm×25 mm were carved. Other molds of differing materials (e.g., platinum, stainless steel, carbon, mullite, etc.) and differing sizes could be used. This was then cooled in the muffle furnace for a minimum of 15 hours to ambient temperature.

Since the final glass composition is very similar to the glass composition in Example 1, the physical-chemical properties (VHT, PCT, TCLP, viscosity, specific electrical conductivity, secondary phase identification) are expected to be the same as in Example 1.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A silicate-based glass comprising:
    rock-forming components selected from the group consisting of SiO$_2$, Al$_2$O$_3$, ZrO$_2$, alkaline earth oxides, alkaline oxides and mixtures thereof; and
    glass-forming components selected from the group consisting of SiO$_2$, Al$_2$O$_3$, ZrO$_2$, B$_2$O$_3$, P$_2$O$_5$, TiO$_2$, Li$_2$O, F, alkaline earth oxides, alkaline oxides and mixtures thereof;
    said silicate-based glass consisting essentially of:
    about 1.6 to about 2.2 parts in weight percent of a combination of monovalent cation oxides (R$_2$O) and divalent cation oxides (RO);
    about 1 part in weight percent of trivalent cation oxides (R$_2$O$_3$);
    about 1 to about 3 parts in weight percent of a combination of tetravalent cation oxides (RO$_2$) and pentavalent cation oxides (R$_2$O$_5$); and
    wherein Na$_2$O is present in an amount greater than 23 weight percent, Al$_2$O$_3$ is present in an amount greater than about 13 weight percent and less than about 20 weight percent, SiO$_2$ is present in an amount greater than about 30 weight percent and less than about 48 weight percent, and B$_2$O$_3$ and other flux components are present in a total amount greater than about 9 weight percent and less than about 15 weight percent.

2. The silicate-based glass of claim 1, wherein the ratio between the rock-forming components of the glass formed, approximates the ratio between the main components of natural high alkaline ultrabasic rock.

3. The silicate-based glass of claim 2, wherein the rock-forming components of
the said silicate-based glass consisting essentially of:
    about 1.6 to about 2.2 parts in weight percent of a combination of monovalent cation oxides (R$_2$O) and divalent cation oxides (RO);
    about 1 part in weight percent of trivalent cation oxides (R$_2$O$_3$);
    about 2 to about 3 parts in weight percent of a combination of tetravalent cation oxides (RO$_2$) and pentavalent cation oxides (R$_2$O$_5$); and
    wherein Na$_2$O is present in an amount greater than 23 weight percent, Al$_2$O$_3$ is present in an amount greater than about 13 weight percent and less than about 20 weight percent, SiO$_2$ is present in an amount greater than about 30 weight percent and less than about 48 weight percent, and B$_2$O$_3$ and other flux components are present in a total amount greater than about 9 weight percent and less than about 15 weight percent.

4. The silicate-based glass of claim 2, wherein the rock-forming components of the silicate-based glass consisting essentially of:
    about 1.6 to about 2.2 parts in weight percent of a combination of monovalent cation oxides (R$_2$O), including alkaline oxides, and divalent cation oxides (RO), including alkaline earth oxides;
    about 1 part in weight percent of trivalent cation oxides (R$_2$O$_3$), wherein said trivalent cation oxides comprise aluminum and ferric oxide;
    about 2 to about 3 parts in weight percent of a combination of tetravalent cation oxides (RO$_2$), including silicon, zirconium and titanium, and pentavalent cation oxides (R$_2$O$_5$), including and phosphorus oxide; and wherein Na$_2$O is present in an amount greater than 23 weight percent, Al$_2$O$_3$ is present in an amount greater than about 13 weight percent and less than about 20 weight percent, SiO$_2$ is present in an amount greater than about 30 weight percent and less than about 48 weight percent, and B$_2$O$_3$ and other flux components are present in a total amount greater than about 9 weight percent and less than about 15 weight percent.

5. The silicate-based glass of claim 1, wherein the silicate-based glass has a viscosity of 20 to 100 poise at a temperature of about 1150 degrees Celsius, that is acceptable for processing in vitrification melters.

6. The silicate-based glass of claim 1, wherein the silicate-based glass has specific electrical conductivity ranging between about 0.1 $\Omega^{-1}$ cm$^{-1}$ to about 0.7 $\Omega^{-1}$ cm$^{-1}$ at a temperature of about 1150 degrees Celsius, that is acceptable for processing in vitrification melters.

7. The silicate-based glass of claim 1, wherein the silicate-based glass meets the Vapor Hydration Test (VHT) requirements of less than about 50 grams per square meter per day, thus meeting current U.S. waste form acceptance criteria.

8. The silicate-based glass of claim 1, wherein the silicate-based glass meets the Product Consistency Test (PCT) requirements of the normalized mass loss of sodium, silicon, and boron being less than about 2 grams per square meter, as defined in the American Society for Testing and Materials (ASTM) C 1285, thus meeting current U.S. waste form acceptance criteria.

9. The silicate-based glass of claim 1, wherein said glass meets the criteria set forth in the U.S. Environmental Protection Agency (EPA) Toxicity Characteristic Leach Test Procedure (TCLP) (SW-846 Method 1311).

10. A silicate-based glass comprising:
rock-forming components selected from the group consisting of SiO$_2$, Al$_2$O$_3$, ZrO$_2$, alkaline earth oxides, alkaline oxides and mixtures thereof; and
glass-forming components selected from the group consisting of SiO$_2$, Al$_2$O$_3$, ZrO$_2$, B$_2$O$_3$, P$_2$O$_5$, TiO$_2$, Li$_2$O, F, alkaline earth oxides, alkaline oxides and mixtures thereof;
said silicate-based glass consisting essentially of:
about 1.6 to about 2.2 parts in weight percent of a combination of monovalent cation oxides (R$_2$O), including alkaline oxides, and divalent cation oxides (RO), including alkaline earth oxides;
about 1 part in weight percent of trivalent cation oxides (R$_2$O$_3$), including aluminum and ferric oxide;
about 1 to about 3 parts in weight percent of a combination of tetravalent cation oxides (RO$_2$), including silicon, zirconium and titanium, and pentavalent cation oxides (R$_2$O$_5$), including phosphorus oxide; and
wherein Na$_2$O is present in an amount greater than 23 weight percent, Al$_2$O$_3$ is present in an amount greater than about 13 weight percent and less than about 20 weight percent, SiO$_2$ is present in an amount greater than about 30 weight percent and less than about 48 weight percent, and B$_2$O$_3$ and other flux components are present in a total amount greater than about 9 weight percent and less than about 15 weight percent.

11. The silicate-based glass of claim 10, wherein the ratio between the rock-forming components of the glass formed, approximates the ratio between the main components of natural high alkaline ultrabasic rock.

12. The silicate-based glass of claim 11, wherein the rock-forming components of the said silicate-based glass consisting essentially of:

about 1.6 to about 2.2 parts in weight percent of a combination of monovalent cation oxides (R$_2$O) and divalent cation oxides (RO);
about 1 part in weight percent of trivalent cation oxides (R$_2$O$_3$);
about 2 to about 3 parts in weight percent of a combination of tetravalent cation oxides (RO$_2$) and pentavalent cation oxides (R$_2$O$_5$); and
wherein Na$_2$O is present in an amount greater than 23 weight percent, Al$_2$O$_3$ is present in an amount greater than about 13 weight percent and less than about 20 weight percent, SiO$_2$ is present in an amount greater than about 30 weight percent and less than about 48 weight percent, and B$_2$O$_3$ and other flux components are present in a total amount greater than about 9 weight percent and less than about 15 weight percent.

13. The silicate-based glass of claim 11, wherein the rock-forming components of the silicate-based glass consisting essentially of:
about 1.6 to about 2.2 parts in weight percent of a combination of monovalent cation oxides (R$_2$O), including alkaline oxides, and divalent cation oxides (RO), including alkaline earth oxides;
about 1 part in weight percent of trivalent cation oxides (R$_2$O$_3$), including aluminum and ferric oxide;
about 2 to about 3 parts in weight percent of a combination of tetravalent cation oxides (RO$_2$), and pentavalent cation oxides (R$_2$O$_5$), including and phosphorus oxide;
wherein said tetravalent cations comprise silicon, zirconium and titanium, and
wherein Na$_2$O is present in an amount greater than 23 weight percent, Al$_2$O$_3$ is present in an amount greater than about 13 weight percent and less than about 20 weight percent, SiO$_2$ is present in an amount greater than about 30 weight percent and less than about 48 weight percent, and B$_2$O$_3$ and other flux components are present in a total amount greater than about 9 weight percent and less than about 15 weight percent.

14. The silicate-based glass of claim 10, wherein the silicate-based glass has a viscosity of 20 to 100 poise at a temperature of about 1150 degrees Celsius, that is acceptable for processing in vitrification melters.

15. The silicate-based glass of claim 10, wherein the silicate-based glass has specific electrical conductivity ranging between about 0.1 $\Omega^{-1}$ cm$^{-1}$ to about 0.7 $\Omega^{-1}$ cm$^{-1}$ at a temperature of about 1150 degrees Celsius, that is acceptable for processing in vitrification melters.

16. The silicate-based glass of claim 10, wherein the silicate-based glass meets the Vapor Hydration Test (VHT) requirements of less than about 50 grams per square meter per day, thus meeting current U.S. waste fog n acceptance criteria.

17. The silicate-based glass of claim 10, wherein the silicate-based glass meets the Product Consistency Test (PCT) requirements of the normalized mass loss of sodium, silicon, and boron being less than about 2 grams per square meter, as defined in the American Society for Testing and Materials (ASTM) C 1285, thus meeting current U.S. waste form acceptance criteria.

18. The silicate-based glass of claim 10, wherein said glass meets the criteria of the U.S. Environmental Protection Agency (EPA) Toxicity Characteristic Leach Test Procedure (TCLP) (SW-846 Method 1311).

19. A silicate-based glass consisting essentially of:
about 1.6 to about 2.2 parts in weight percent of a combination of monovalent cation oxides (R$_2$O) and divalent cation oxides (RO);

about 1 part in weight percent of trivalent cation oxides ($R_2O_3$);

about 1 to about 2 parts in weight percent of a combination of tetravalent cation oxides ($RO_2$) and pentavalent cation oxides ($R_2O_5$);

wherein $Na_2O$ is present in an amount greater than 23 weight percent, $Al_2O_3$ is present in an amount greater than about 13 weight percent and less than about 20 weight percent, $SiO_2$ is present in an amount greater than about 30 weight percent and less than about 48 weight percent, and $B_2O_3$ and other flux components are present in a total amount greater than about 9 weight percent and less than about 15 weight percent;

insuring that the melted glass with integrated waste meets the Vapor Hydration Test (VHT) requirements of less than about 50 grams per square meter per day;

insuring that the melted glass with integrated waste meets the Product Consistency Test (PCT) requirements wherein the silicate-based glass meets the Product Consistency Test (PCT) requirements of the normalized mass loss of sodium, silicon, and boron being less than about 2 grams per square meter, as defined in the American Society for Testing and Materials (ASTM) C 1285; and wherein said glass meets the criteria of the U.S. Environmental Protection Agency (EPA) Toxicity Characteristic Leach Test Procedure (TCLP) (SW-846 Method 1311).

20. A silicate-based glass consisting essentially of:

about 1.6 to about 2.2 parts in weight percent of a combination of monovalent cation oxides ($R_2O$) and divalent cation oxides (RO);

about 1 part in weight percent of trivalent cation oxides ($R_2O_3$);

about 1 to about 2 parts in weight percent of a combination of tetravalent cation oxides ($RO_2$) and pentavalent cation oxides ($R_2O_5$); and wherein $Na_2O$ is present in an amount greater than 24 weight percent, $Al_2O_3$ is present in an amount greater than about 13 weight percent and less than about 20 weight percent, $SiO_2$ is present in an amount greater than about 30 weight percent and less than about 48 weight percent, and $B_2O_3$ and other flux components are present in a total amount greater than about 9 weight percent and less than about 15 weight percent.

21. The silicate-based glass of claim 20, wherein $Na_2O$ is present in an amount greater than 25 weight percent.

22. The silicate-based glass of claim 20, wherein $Na_2O$ is present in an amount greater than 26 weight percent.

23. The silicate-based glass of claim 20, wherein $Na_2O$ is present in an amount greater than 27 weight percent.

24. The silicate-based glass of claim 20, wherein $Na_2O$ is present in an amount greater than 28 weight percent.

25. The silicate-based glass of any of claim 20, wherein $Al_2O_3$ is present in an amount greater than about 15 weight percent and less than about 20 weight percent.

\* \* \* \* \*